March 22, 1966 H. L. OPAD 3,242,383
MONITORING CIRCUIT FOR DETECTING PHASE FAILURE IN
A MULTI-PHASE ELECTRIC POWER SUPPLY CIRCUIT
Filed July 14, 1965
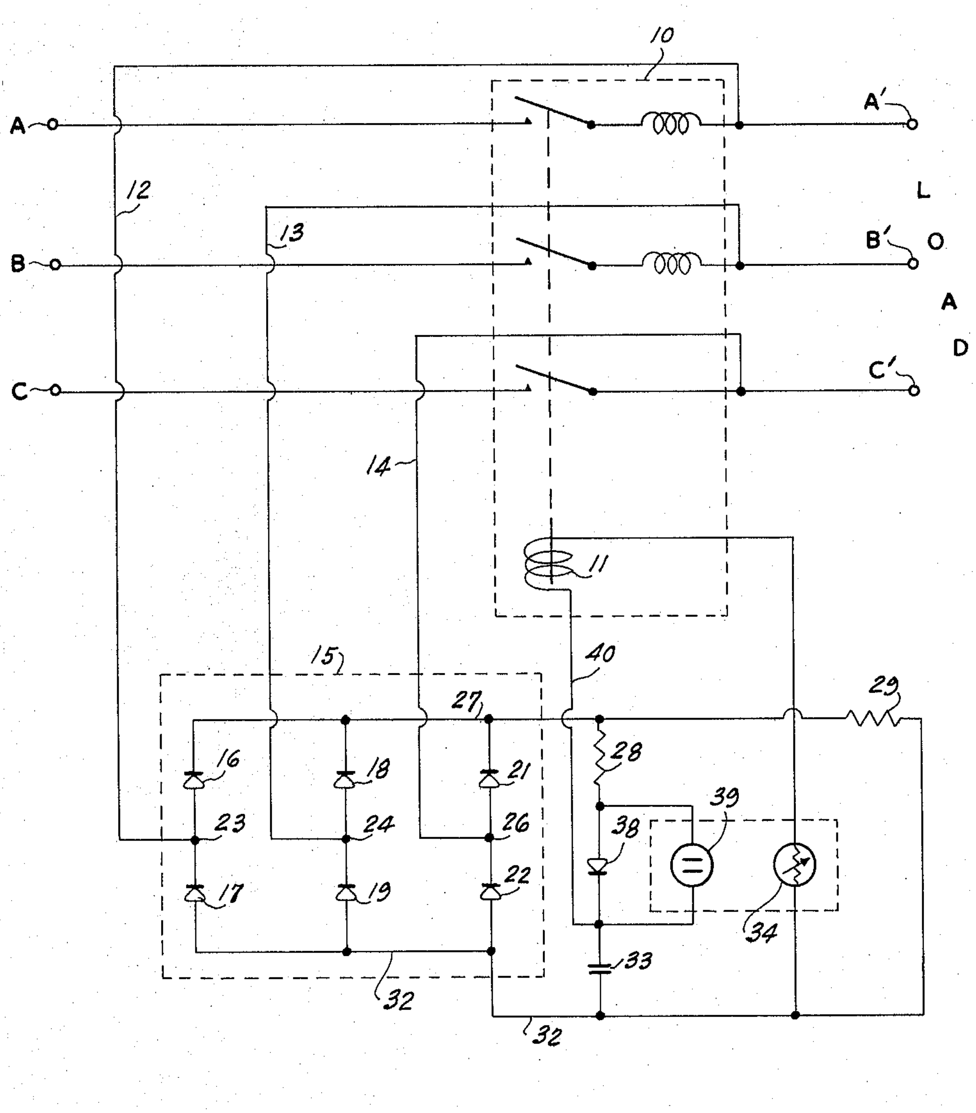
INVENTOR
HENRY L. OPAD
BY
ATTORNEY 3,242,383
Patented Mar. 22, 1966

3,242,383

MONITORING CIRCUIT FOR DETECTING PHASE FAILURE IN A MULTI-PHASE ELECTRIC POWER SUPPLY CIRCUIT

Henry L. Opad, 245 Bennett Ave., New York, N.Y.
Filed July 14, 1965, Ser. No. 471,847
5 Claims. (Cl. 317—46)

This invention relates to multi-phase electrical systems, particularly to three phase power supply systems, and has for its principal object to protect electrical equipment served thereby in the event of a voltage failure on one or more phases of the power supply system. This application is a continuation-in-part of my copending application for U.S. Letters Patent identified as Serial No. 318,293, filed October 23, 1963, now abandoned.

Another object of the invention is to provide an electrical signal which is of sufficient magnitude to trip a circuit breaker in the event of a phase failure in a multi-phase power supply system.

Still another object of the invention is to provide a non-mechanical monitoring circuit for sensing a loss of voltage on one or more phases of a multi-phase power supply system.

Yet another object of the invention is to provide such a monitoring circuit which functions in a reliable manner.

A further object of the invention is to provide such a monitoring circuit which is simple, practical and economical in construction.

In accordance with an aspect of this invention, a monitoring circuit for detecting phase failure in a multi-phase electrical power supply circuit comprises a three phase full wave bridge rectifier circuit connected to the supply circuit and being converted to a single phase full wave bridge rectifier circuit upon loss of voltage in a phase of the multi-phase supply circuit, a device adapted to be rendered effective upon a loss of voltage in a phase of the multi-phase supply circuit, and means responsive to the converted bridge rectifier circuit for rendering such device effective.

The device rendered effective upon a loss of voltage in a phase of the multi-phase supply circuit may be simply a lamp which is illuminated to indicate such loss of voltage, or such lamp may be associated with a light dependent resistor responsive to illumination of the lamp for providing a low resistance path through which the tripping coil of a circuit breaker is energized to disconnect an electrical load from the power supply circuit.

The means responsive to conversion of the bridge rectifier circuit to single phase operation preferably includes a resistor, diode and capacitor connected in series across the output of the bridge rectifier circuit and having the lamp connected across such diode. If a loss of voltage on a phase of the multi-phase power supply circuit occurs prior to the connection of the monitoring circuit thereto, the relatively high superimposed alternating current ripple component superimposed on the relatively low direct current output voltage of the bridge rectifier circuit converted to single phase operation is effective to illuminate the lamp. On the other hand, if the multi-phase power supply circuit initially operates normally, the capacitor is charged to approximately its peak valve and, when a loss of voltage occurs on one or more of the phases of the power supply circuit, the difference in voltage between the charged capacitor and the output of the bridge rectifier circuit converted to single phase operation appears across the diode and energizes the lamp.

The above, and other objects, features and advantages of this invention, will be apparent in the following detailed description of an illustrative embodiment thereof which is to be read in connection with the accompanying drawing, wherein the single view is a wiring diagram of the described embodiment.

Referring now to the drawing there is shown diagrammatically a three phase alternating current power supply circuit comprising phase conductors A, B and C connected to the line side of a conventional circuit breaker 10 which is provided with a relay tripping coil 11. A neutral conductor for the three phase circuit is not shown as it is not concerned with the invention. The other side of the circuit breaker 10 is shown connected by three phase conductors A′, B′ and C′ to a suitable load, the character of which is immaterial and not necessary to be shown in explaining the invention.

Three conductors 12, 13 and 14 extend from the load side of circuit breaker 10 to a three phase full wave bridge circuit 15 comprising diodes 16, 17, 18, 19, 21 and 22. Conductor 12 is connected to a juncture 23 between diodes 16 and 17; conductor 13 is connected to a juncture 24 between diodes 18 and 19, and conductor 14 is connected to a juncture 26 between diodes 21 and 22. The three diodes 16, 18 and 21 are joined together by a conductor 27, which is also connected to one side each of a resistor 28 and a resistor 29.

The three diodes 17, 19 and 22 are joined together by a conductor 32 which is also connected to one side each of a capacitor 33 and a light dependent resistor 34 and to the other side of resistor 29. Between the other sides of capacitor 33 and resistor 28 are shown connected a diode 38 in parallel with a neon bulb 39 while between diode 38 and the other side of capacitor 33 a lead 40 is shown connected to one side of the tripping coil 11 of circuit breaker 10. The other side of light dependent resistor 34 is connected to the other side of relay tripping coil 11.

The output of the three phase full wave diode bridge rectifier circuit 15 is characterized, during normal operation of the power supply system, by a high direct current value with a relatively low superimposed alternating current ripple component. The neon bulb 39 is mounted in close proximity to the light dependent resistor 34, so as to cause the latter to respond to the light emanating from the bulb when illuminated.

Typical components used in the phase failure detector of the invention are as follows:

| No. | Description | Mfgr's Part No. |
|---|---|---|
| 33 | Cap., 100 mfd., 350 WVDC. | Corn.-Dubilier, BR100-350. |
| 16–19, 21, 22 | Sil. Diodes, 600 PIV .75A | Int'l Rect. Corp., 5E6. |
| 34 | Light Depend, Resistor | Clairex, CL505. |
| 39 | Neon Lamp | General Elec., NE76. |
| 29 | Res. 57,000 Ohms, 2 w | Ohmite. |
| 28 | Res., 560 Ohms, ½ w | Ohmite. |
| 10 | Circuit Breaker | Heinemann, AM363. |

The above described embodiment of the invention operates as follows:

When the three phase power supply is operating normally over phases A, B and C and connected through circuit breaker 10 to the load, capacitor 33 is charged through bridge circuit 15, resistor 28 and diode 38 to about peak value. Capacitor 33 remains at this value during normal operation but, if one or more phases of the three phase power supply should lose voltage, the three phase full wave bridge rectifier 15 converts to a single phase full wave bridge having a much lower direct current output voltage with a relatively high superimposed alternating current ripple component. For example, if phase A were to lose its voltage then, voltage over conductor 12 to diodes 16 and 17 would be lost and phase conductors 13 and 14 would operate as a single phase upon diodes 18, 19 and 21, 22, respectively. Consequently, the difference in voltage between the capacitor 33 and the single phase full wave bridge rectifier, and also the alternating current ripple component of the bridge output, will appear across diode 38 and energize neon bulb 39, which in becoming illuminated will cause the resistance of light dependent resistor 34 to drop rapidly. Capacitor 33 then discharges through lowered resistor 34 and relay tripping coil 11 in an obvious circuit, whereby the circuit breaker 10 is tripped and the power supply for the load is interrupted.

Should the circuit breaker 10 be initially closed at a time when one of the phases of the three phase supply circuit had previously lost its voltage then, as before, the three phase full wave bridge circuit 15 operates as a single phase full wave bridge, the output of which is now characterized by a direct current voltage with a relatively high superimposed alternating current ripple component. This ripple component now acts to energize neon bulb 39 and illumination of the latter causes the resistance of light dependent resistor 39 to again drop rapidly. The tripping coil 11 is thus energized from bridge circuit 15, operating as a single phase rectifier bridge circuit, over conductor 27, resistor 28, diode 38, conductor 40, coil 11, and thence through lowered resistor 34 and conductor 32 back to bridge circuit 15. The energized coil 11 opens or trips circuit breaker 10 and thereby protects the load equipment from the damage thereto that might result from its connection to the faulty multi-phase power supply sysem.

Although illumination of the neon lamp 39 is employed for reducing the resistance of light dependent resistor 34 and thereby effecting energization of the tripping coil 11 of circuit breaker 10 in the illustrated embodiment of the invention, it will be apparent that protective devices other than the circuit breaker, for example, an audible or visual alarm or indicator, may be substituted for the circuit breaker so as to be energized through a circuit including resistor 34 when the resistance of the latter is reduced. Further, the neon lamp 39 may itself constitute a visual indicator for calling an operator's attention to the loss of voltage on a phase of the multi-phase power supply system.

From the foregoing description it will be seen that the present invention provides an improved non-mechanical monitoring circuit for the purposes indicated herein, which circuit is simple, practical and economical in construction and is reliable in operation to protect three phase electrical equipment when a phase thereof is inoperative either before or after the circuit breaker is operated to connect the equipment thereto.

Although an illustrative embodiment of the invention has been described herein with reference to the accompanying drawing, it is to be understood that the invention is not limited to that precise embodiment, and that various changes and modifications may be effected therein by one skilled in the art without departing from the scope or spirit of the invention as defined in the appended claims.

What is claimed is:

1. Apparatus for protecting an electrical load against a phase failure in a multi-phase electrical power supply circuit therefor, comprising a circuit breaker for connecting said supply circuit with the load and having a tripping coil operative to open the circuit breaker upon energization thereof, a three phase full wave bridge rectifier circuit connected with said circuit breaker at the load side of the latter and having a high direct current output voltage with a relatively low superimposed alternating current ripple component during normal operation of the supply circuit, said bridge rectifier circuit converting to a single phase full wave bridge rectifier circiut having a relatively low direct current output with a high superimposed alternating current ripple component upon a loss of voltage on a phase of said supply circuit, a resistor, diode and capacitor connected in series across the output of said bridge circuit, lamp means connected across said diode so as to be illuminated upon said loss of voltage of a phase of the supply circuit, a light dependent resistor disposed adjacent said lamp means so as to have its resistance reduced in response to illumination of said lamp means, and means connecting said tripping coil in series with said light dependent resistor across said capacitor so that said coil is energized to open the circuit breaker when said resistance of the light dependent resistor is reduced.

2. A monitoring circuit for detecting phase failure in a multi-phase electrical power supply circuit comprising a three phase full wave bridge rectifier circuit connected to said supply circuit, said three phase full wave bridge rectifier circuit being converted to a single phase full wave bridge rectifier circuit having a relatively high alternating current ripple component superimposed on a relatively low direct current output voltage upon loss of voltage in a phase of said multi-phase supply circuit, a resistor, diode and capacitor connected in series across the output of said bridge rectifier circuit so that said capacitor is charged approximately to its peak value during normal operation of said multi-phase supply circuit, and electrically energizable fault sensing means connected across said diode and being operable by said relatively high superimposed alternating current ripple component and by the charge on said capacitor upon loss of voltage in at least one phase of said multi-phase supply circuit.

3. A monitoring circuit according to claim 2; wherein said fault sensing means includes a lamp connected across said diode.

4. A monitoring circuit according to claim 2; wherein said fault sensing means includes a lamp connected across said diode, a light dependent resistor positioned in close proximity to said lamp so as to have its resistance reduced in response to illumination of said lamp, and electrically operable control means connected in series with said light dependent resistor across said capacitor so as to be operated upon reduction of the resistance of said light dependent resistor.

5. A monitoring circuit according to claim 4; wherein said electrically operable control means is constituted by a tripping coil of a circuit breaker for connecting said supply circuit to an electrical load, whereby the load is disconnected from the supply circuit upon a loss of voltage in a phase of the supply circuit.

References Cited by the Examiner

UNITED STATES PATENTS

| | | | |
|---|---|---|---|
| 3,023,345 | 2/1962 | Williams. | |
| 3,181,030 | 4/1965 | Weinstein | 317—124 |

STEPHEN W. CAPELLI, *Primary Examiner.*

SAMUEL BERNSTEIN, *Examiner.*

R. V. LUPO, *Assistant Examiner.*